(12) United States Patent
Toriida et al.

(10) Patent No.: US 7,217,780 B2
(45) Date of Patent: May 15, 2007

(54) POLYETHER KETONE AND METHOD OF PRODUCING THE SAME

(75) Inventors: Masahiro Toriida, Sodegaura (JP); Takashi Kuroki, Sodegaura (JP); Takaharu Abe, Sodegaura (JP); Akira Hasegawa, Sodegaura (JP); Kuniyuki Takamatsu, Sodegaura (JP); Yoshiteru Taniguchi, Sodegaura (JP); Isao Hara, Sodegaura (JP); Setsuko Fujiyoshi, Sodegaura (JP); Tadahito Nobori, Sodegaura (JP); Shoji Tamai, Sodegaura (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 10/498,096

(22) PCT Filed: Dec. 10, 2002

(86) PCT No.: PCT/JP02/12914

§ 371 (c)(1),
(2), (4) Date: Jun. 10, 2004

(87) PCT Pub. No.: WO03/050163

PCT Pub. Date: Jun. 19, 2003

(65) Prior Publication Data

US 2005/0085597 A1   Apr. 21, 2005

(30) Foreign Application Priority Data

| Dec. 11, 2001 | (JP) | 2001-377543 |
| May 20, 2002 | (JP) | 2002-145027 |
| Oct. 7, 2002 | (JP) | 2002-293829 |

(51) Int. Cl.
  *C08G 14/04* (2006.01)
  *C08G 14/12* (2006.01)
  *C08G 8/28* (2006.01)

(52) U.S. Cl. ............ 528/125; 528/129; 528/220; 528/488; 528/499; 528/503; 525/474; 525/534

(58) Field of Classification Search ............ 528/220, 528/125, 129, 488, 499, 503; 525/471, 534
See application file for complete search history.

(56) References Cited

U.S. PATENT DOCUMENTS

| 4,108,837 A |   | 8/1978 | Johnson et al. |
| 4,657,990 A | * | 4/1987 | Daoust et al. ............ 525/471 |
| 5,247,052 A |   | 9/1993 | Lücke et al. |
| 5,605,745 A |   | 2/1997 | Recker et al. |

FOREIGN PATENT DOCUMENTS

| GB | 1078234 | 8/1967 |
| JP | 60-144329 A | 7/1985 |
| JP | 61-213219 A | 9/1986 |
| JP | 61-247731 A | 11/1986 |
| JP | 06-032892 A | 2/1994 |
| JP | 06-032893 A | 2/1994 |

* cited by examiner

Primary Examiner—Duc Truong
(74) Attorney, Agent, or Firm—Buchanan Ingersoll & Rooney PC

(57) ABSTRACT

There are disclosed, a polyether ketone having a primary particle size of 50 μm or less; and a method of producing a polyether ketone by a desalting polycondensation, which contains a step of conducting a polymerization reaction under a condition of deposition of the polymer. The polyether ketone obtained by the present invention has small particle size, high molecular weight and sufficiently small content of impurities such as alkali metal components.

3 Claims, 1 Drawing Sheet

86 μm

86 μm

86 μm

POLYETHER KETONE AND METHOD OF PRODUCING THE SAME

TECHNICAL FIELD

The present invention relates to a fine powdery polyether ketone having small particle size, high molecular weight and sufficiently small content of impurities such as alkali metals, and suitable as, for example, coating materials, furthermore, electric and electronic component materials or jig materials used for production of semiconductors and electric and electronic components; and a method of producing the same.

BACKGROUND ART

Aromatic polyether ketones have excellent heat resistance, chemical resistance, molding processability, mechanical properties and electric properties, and widely used in electronic parts, jigs for semiconductor process, mechanical parts of automobiles and OA equipments.

Methods of producing an aromatic polyether ketone are roughly classified into two polymerization routes. One is an aromatic electrophilic substitution reaction, and another is an aromatic nucleophilic substitution reaction. As the aromatic electrophilic substitution reaction, there are, for example, a method of obtaining a polyether ketone by using nitrobenzene as a solvent (see U.S. Pat. No. 3,065,205), and a report of slight increase in molecular weight by using dichloromethane as a solvent (UK Patent No. 971,227). However, any of them give extremely low molecular weight.

U.S. Pat. No. 3,442,857 discloses that a polyether ketone having high molecular weight is obtained by an aromatic electrophilic substitution reaction, in a $HF/BF_3$ system by using a liquid hydrogen fluoride as a solvent. However, in the method of producing a polyether ketone by an aromatic electrophilic substitution reaction, a straight chain polymer is not obtained easily because a polymer having high molecular weight is not obtain easily and the reaction position on an aromatic ring cannot be restricted easily, and resultantly, a thermal physical property is poor. Even obtained, it is necessary to use a strong acidic solvent of high toxicity, therefore, processes such as neutralization and deoxidation treatments become inevitable, and they are not preferable in industrial view points.

Furthermore, it is also known that a polyether ketone having low molecular weight is obtained by direct dehydration polycondensation by an aromatic electrophilic substitution reaction using a polyphosphoric acid as a solvent (see J. Polym. Sci. A-1, 6, 3345 (1968)). However, a phosphorus component remains as an impurity in the resulted polyether ketone because polyphosphoric acid is used in this system. Thus it is not preferable.

UK Patent No. 1,387,303 discloses that a polymer having high molecular weight is obtained likewise, even if $HF/BF_3$ is directly used in a dehydration polycondensation method. However, it is necessary to use a strong acidic solvent of high toxicity. Thus it is not preferable in industrial use.

On the other hand, it is known that polymerization of a polyether ketone by an aromatic nucleophilic substitution reaction can be conducted by producing an alkali metal salt of an aromatic diol using an alkali metal compound as a catalyst, and then effecting a polycondensation reaction with a halogenated benzophenone compound (see, J. Polym. Sci. A-1, 5, 2375 (1967)). The above-mentioned aromatic nucleophilic substitution reaction is called a desalting polycondensation method because a halogenated alkali metal salt is released in polycondensation. Usually, in this method, polymerization progresses by reaction of a polymer dissolved in a solvent. However, a polymer having low solubility in a solvent such as, for example, a polyether ether ketone deposits at the stage of low molecular weight and the subsequent polymerization reaction does not progress. Therefore, a polymer having high molecular weight cannot be obtained.

It is said important to sufficiently remove water from the reaction system in a desalting polycondensation method wherein the water is by-produced in production of an alkali salt of an aromatic diol. For example, Japanese Patent Application Publication (JP-B) No. 42-7799 discloses that it is essential to keep a solvent under anhydrous condition before the reaction and during the reaction in a polymerization reaction. For removing water from the reaction system, a method of distilling off by benzene or toluene as an azeotropic solvent of water and a method of removing the distilled water by adsorption on a molecular sieve are used.

Regarding the polyether ether ketone having low solubility in a solvent, the polymer having high molecular weight is obtained by keeping the reaction system wherein the polymer is constantly dissolved at extremely high temperature. However, in this method, it is necessary to conduct a polymerization reaction at extremely high temperature, and an extremely complicated process is necessary for purification. Macromolecules, 23, 4029 (1990) discloses that when diphenylsulfone is used as a solvent in production of polyether ether ketone, the molecular weight is not increased at polymerization temperatures of not more than 280° C. at which the produced polymer deposits. Similarly, there is also a method in which diphenylsulfone is used as a polymerization solvent, temperature is gradually increased for keeping the produced polymer in dissolved condition, and the reaction is effected finally at 320° C. (see JP-B No. 60-32642). As described above, in conventional methods of producing polyether ether ketone, it has been necessary to conduct a polymerization reaction at extremely high temperatures for obtaining a high molecular weight polymer.

However, because the reaction is conducted at extremely high temperature for the solution polymerization as described above, there is a fear of gelation and decomposition reaction of a polymer to enlarge the molecular weight distribution, and additionally, economical and environmental aspects are also poor. Furthermore, when the reaction liquid is cooled after completion of the reaction, the produced polymer is coagulated together with a catalyst and an alkali metal salt, therefore, a process of fine grinding is necessary for purification of a polymer.

Furthermore, it is extremely difficult to finely mechanical-grind a polymer having high molecular weight which is sufficient to obtain an excellent mechanical strength as a molded article and coating, and it has been impossible to obtain a polymer having an alkali metal content of 20 ppm or less even if washing is reinforced so much.

Under the above-mentioned conditions, there has been a necessity for a polyether ketone having various physical properties such as molecular weight and mechanical physical properties equivalent to those of conventional products, having a polymer particle size smaller sufficiently than that of conventional products, and having a content of impurities such as alkali metal components smaller sufficiently than that of conventional products, and a method of producing the same.

DISCLOSURE OF INVENTION

An object of the present invention is to provide a polyether ketone excellent as a coating material and in the form of fine powder, furthermore, excellent as an electric and electronic component material or jig material used in production of semiconductors and electric and electronic components and having high purity. More specifically, an object of the present invention is to provide a polyether ketone having a smaller particle size, higher molecular weight and sufficiently smaller content of impurities such as alkali metal components as compared with polyether ketones obtained in conventional methods, and a method of producing the same.

The present inventors have intensively investigated to solve the above-mentioned problems, and resultantly found that by conducting a polymerization reaction under the condition of deposition of the polymer in a desalting polycondensation, preferably by conducting a polymerization reaction even under the condition of deposition of the produced polymer in the co-existence of water at early stage of the reaction, the resulting polyether ketone has sufficiently small average particle size and primary particle size, and impurities such as alkali metal components and volatile components can be easily removed, leading to completion of the invention.

Namely, the present invention relates to a polyether ketone having a primary particle size of 50 μm or less; and a method of producing a polyether ketone by a desalting polycondensation, which contains a step of conducting a polymerization reaction under a condition of deposition of the polymer.

The polyether ketone obtained by the present invention is, due to very small particle size, excellent particularly in coatability in coating application, and, due to very small content of impurities and very small amount of generation of an out gas at high temperatures, excellent in a clean property required for electric and electronic component and semiconductor applications.

BEST MODE FOR CARRYING OUT THE INVENTION

Figure 1:
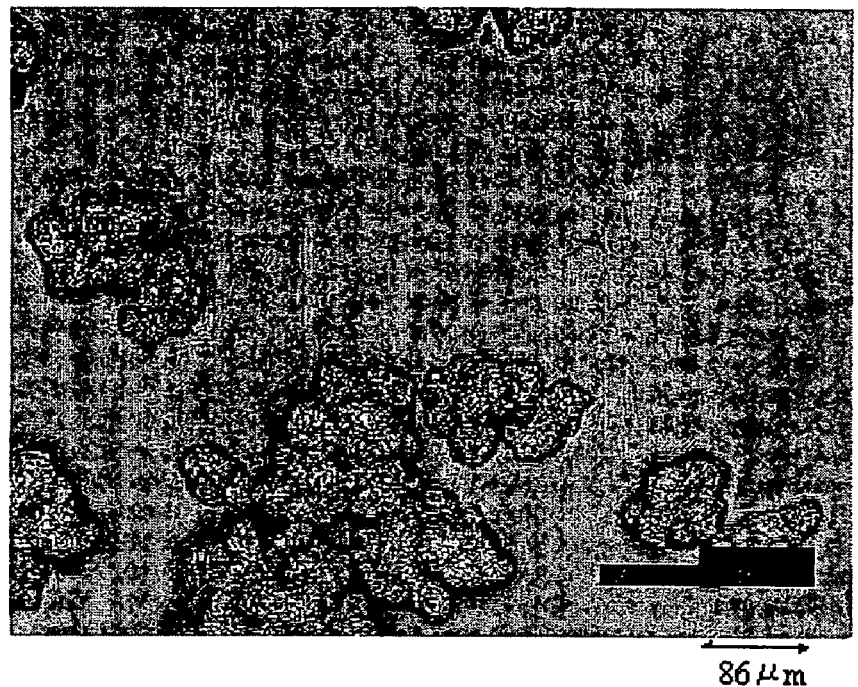
FIG. 1 is a view of the image of a polymer particle obtained in Example 1 observed by a laser microscope.

The polyether ketone in the present invention is not particularly restricted, and is a polymer containing a carbonyl bond and an ether bond in a repeating unit structure, and preferably, a polymer having a repeating unit structure of the following structural formula (1):

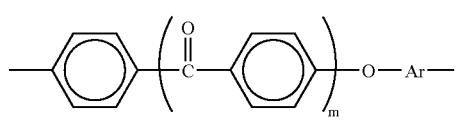
(1)

wherein, m represents an integer of 1 to 4, and Ar represents one of the moieties in the following formula (2):

direct bond,

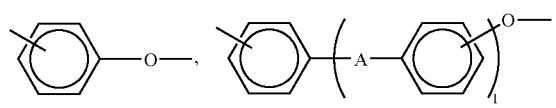
(2)

wherein, A represents a direct bond, —O—, —SO$_2$—, —CO—, —CH$_2$—, —CH(CH$_3$)— or —C(CH$_3$)$_2$—, and l represents an integer of 0 to 4.

Regarding polyether ketones in the present invention, listed as those having structures other than the above-mentioned structures are polymers having repeating unit structures of the following structural formulae (3) and (4).

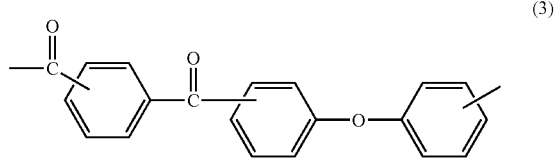
(3)

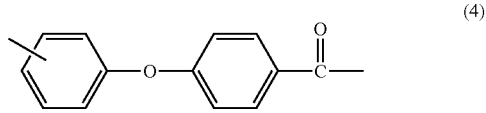
(4)

The polyether ketone of the present invention has a primary particle size of 50 μm or less, preferably 30 μm or less, more preferably 20 μm or less. The primary particle in the present invention indicates a spherical particle forming a polyether ketone grain, and can be confirmed by for example microscope observation of grain. The primary particles coagulate to form a grain in some cases, however, the primary particle in the present invention means an individual particle forming a grain.

When the primary particle size is larger than 50 μm, it becomes difficult to remove a catalyst used in the reaction and an alkali metal salt by-produced, and a polymer having high purity cannot be obtained. Here, even if a grain is formed by coagulation of primary particles, primary particles are mutually bonded only at the surface weakly, and there is a gap at its interface, consequently, a sufficient purification effect is obtained when the primary particle size is sufficiently small. Furthermore, it is also easy to disperse it electrically or mechanically. The grain obtained mechanical grinding of primary particles has a sharp broken surface, therefore, it can be definitely distinguished from the primary particle.

Furthermore, the polyether ketone of the present invention has an average particle size of preferably 100 μm or less, more preferably 80 μm or less, further preferably 50 μm or less.

The average particle size in the present invention denotes the particle size at a cumulative frequency of 50% in the case of measurement of the particle size distribution of particles dispersed in water providing the refractive index of the particles is 1.65, by a laser diffraction scattering method. The primary particle size denotes, in the case of formation of a larger particle by coagulation of spherical particles when polyether ketone particles are observed in magnification by for example a microscope, its spherical particle size.

The method of producing a polyether ketone of the present invention is not particularly restricted, and for example there can be used a FriedelCraft's reaction which is an aromatic electrophilic substitution reaction, a direct dehydration polycondensation method, or a desalting polycondensation reaction which is an aromatic nucleophilic substitution reaction. In particular, a desalting polycondensation reaction is preferable, and it is more preferable to conduct a polymerization reaction under the condition of deposition of a polymer in producing a polyether ketone by a desalting polycondensation reaction.

The desalting polycondensation reaction in the present invention is a reaction in which polymerization progresses by releasing of a halogenated alkali metal salt in reaction with a halogenated aromatic compound after production of an alkali metal salt of aromatic phenols using an alkali metal compound as a catalyst, as described, for example, in Polymer, 25, 1827 (1984). In general, an aromatic diols is used as aromatic phenols and a halogenated benzophenone is used as a halogenated aromatic compound, in the case of production of an aromatic polyether ketone.

The polymerization reaction under the condition of a polymer in the present invention indicates a reaction of increasing its molecular weight even after deposition of a polymer. As the typical reaction condition, there is mentioned, for example, a condition in which, at the early stage of the reaction, a monomer and/or oligomer is dissolved to make once a uniform reaction solution, then, a polymer deposits together with the progress of the reaction, and even when the reaction solution turns into slurry, the reaction is continued to give molecular weight increased as compared with that in deposition. Here, though the degree of increase in the molecular weight after deposition is not particularly restricted, and it is preferable that the reduced viscosity (η inh) of a polymer in completion of the reaction increases by 0.1 dl/g or more as compared with the reduced viscosity (72 inh) in deposition, and more preferably by 0.2 dl/g or more.

In conventional desalting polycondensation reactions, it is said that the deposited polymer has extremely low reactivity, and there is no increase in molecular weight after deposition. However, when water is allowed to present preferably in the reaction system in formation of an alkali metal salt of aromatic phenols which is a dehydration reaction, formation of an alkali metal salt of aromatic phenols and/or polymer end phenol is promoted, and resultantly, the polymerization reaction progresses also after deposition, to increase the molecular weight of the polymer. By presence of water in the reaction system, production of a gelled substance by progress of a crosslinking reaction can be suppressed, and the reproducibility of the degree of polymerization tends to be improved. Here, the amount of the presence of water in the reaction system is not particularly restricted, and an amount of about 0.01 to 10-fold mol, preferably 0.5 to 2-fold mol based on aromatic phenols used is sufficient.

As the method of feeding water into the reaction system, there is a method in which water is added in charging raw materials at early stage of the reaction or during the reaction, and water contained in raw materials and solvent by moisture absorption is used as it is. Additionally, a method in which all or part of condensed water produced by the reaction is returned into the system, and other methods can be adopted. In the end period of the reaction, it is preferable that water produced by addition or condensation is distilled off out of the system.

In the present invention, as aromatic phenols which can be used in producing a polyether ketone by a desalting polycondensation reaction, mentioned are for example aromatic diol compounds of the following formula:

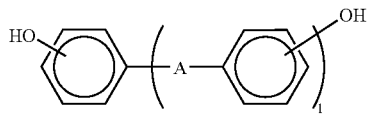

wherein, A represents a direct bond, —O—, —SO$_2$—, —CO—, —CH$_2$—, —CH(CH$_3$)— or —C(CH$_3$)$_2$—, and l represents an integer of 0 to 4.

These aromatic diols may be used singly or in admixture of two or more. Preferable specific examples of the aromatic diols include hydroquinone, resorcinol, catechol, 4,4'-dihydroxybiphenyl, 4,4'-dihydroxybenzophenone, 2,2-bis-(4-hydroxyphenyl)propane, bis-(2-hydroxyphenyl)methane, bis-(4-hydroxyphenyl)methane, 1,1-bis-(4-hydroxyphenyl)ethane, 1,2-bis-(4-hydroxyphenyl)ethane, bis-(4-hydroxyphenyl)sulfone, bis-(2-hydroxyphenyl)sulfone bis-(4-hydroxyphenyl) ether and bis-(2-hydroxyphenyl) ether. Among them, hydroquinone, 4,4'-dihydroxybiphenyl and 4,4'-dihydroxybenzophenone are preferable.

As the dihalogenated benzophenone which can be used in the present invention, for example, compounds of the following formula are listed:

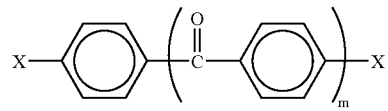

wherein, X represents a fluorine atom, chlorine atom, bromine atom or iodine atom, and m represents an integer of 1 to 4.

Specifically listed are, for example, 4,4'-difluorobenzophenone, 4,4'-dichlorobenzophenone and 4-chloro-4'-fluorobenzophenone.

Also compounds having both a hydroxyl group and a halogen group in the same molecular can be subjected to similar polycondensation. As the compound which can be used in this reaction, for example, 4-hydroxy-4'-fluorobenzophenone and 4-hydroxy-4'-chlorobenzophenone are listed.

As the other monomers which can be used in the present invention, for example, compounds of the following formula are listed:

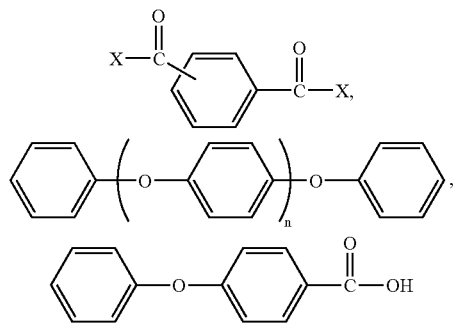

wherein, X represents a fluorine atom, chlorine atom, bromine atom or iodine atom, and n represents an integer of 1 to 4.

Specific examples thereof include isophthalic dichloride, terephthalic dichloride, diphenyl ether and p-phenoxybenzoic acid.

In the present invention, the molar ratio of a diol to a dihalide is an important factor for determining degree of polymerization, and preferably, diol: dihalide=0.8 to 1.2:1.2 to 0.8, further preferably, diol:dihalide=0.9 to 1.1:1.1 to 0.9.

The reaction process of a polyether ketone in the present invention is, for example, as shown below.

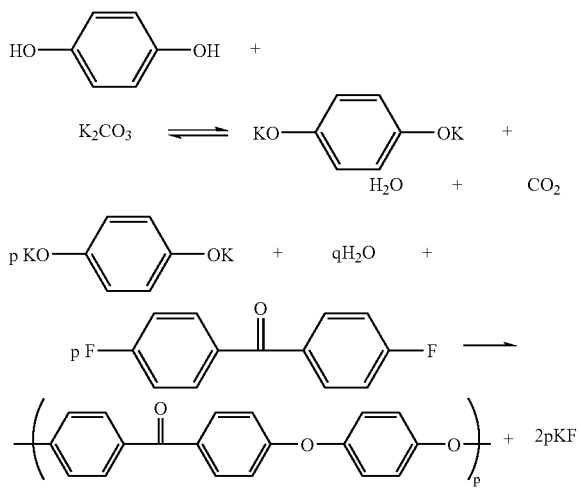

As the alkali metal compound which can be used in the present invention, there are listed, for example, carbonates such as lithium carbonate, sodium carbonate, potassium carbonate, rubidium carbonate and cesium carbonate; hydrogen carbonates such as sodium hydrogen carbonate, potassium hydrogen carbonate, rubidium hydrogen carbonate and cesium hydrogen carbonate; hydroxides such as lithium hydroxide, sodium hydroxide, potassium hydroxide, rubidium hydroxide and cesium hydroxide. These may be used singly or in admixture of two or more. The use amount of these alkali metal compounds is, in the case of a divalent compound, preferably from 1 to 2 mol based on 1 mol of a diol compound, and in the case of a monovalent compound, preferably from 2 to 4 mol based on 1 mol of a diol compound. These preferable ranges are significant in the point of sufficiently producing an alkali metal salt of a diol compound to increase the degree of polymerization, and in the point of preventing excess alkali metal compounds from hydrolyzing the produced polymer, to decrease the degree of polymerization.

As the solvent which can be used in the present invention, there are listed, for example, sulfolane, dimethyl sulfoxide, dimethylsulfone, diphenylsulfone, dimethylformamide, dimethylacetamide, N-methyl-2-pyrrolidone, 1,3-dimethylimidazolidinone and 1,3-dimethylimidazol-2-one. The used amount of these compounds is not particularly restricted, and preferably from about 1 to 50-fold of the total monomer weight.

The reaction temperature in the present invention is preferably from 150 to 250° C. The preferable range is significant in the point of reaction speed, in the point of preventing the reaction from progressing under dissolved condition of a polymer, to suppress a gelation reaction and a decomposition reaction, further in the point of suppressing a polymer from coagulating together with a catalyst and an alkali metal salt in cooling after completion of the reaction, to obtain a polymer in the form of fine powder of high purity.

Regarding the reaction atmosphere, it is preferable to use an inert gas atmosphere such as nitrogen and argon, avoiding oxygen to prevent oxidation of an alkali metal salt of a diol.

To stop the reaction in production of the polyether ketone of the present invention, it may be advantageous to cool the reaction product. Here, when a phenoxide group is present at the end of a polymer, it is preferable to stabilize the phenoxide group by adding a compound such as an aliphatic halide and aromatic halide lest the thermal property of the resulted polymer should deteriorate. Specific examples of these halides include methyl chloride, ethyl chloride, 4,4'-difluorobenzophenone, 4-fluorobenzophenone, 4,4'-dichlorobenzo-phenone, 4-chlorobenzophenone, p-chloronitrobenzene, 4,4'-dichlorodi-phenylsulfone and 4-chlorodiphenylsulfone. It is sufficient that the amount of a halide to stop the reaction is from 0.01 to 0.2-fold mol based on the aromatic diol used.

The polyether ketone obtained at the completion of the reaction in production of the polyether ketone of the present invention has a primary particle size of 50 µm or less, therefore, coexistent catalysts, alkali metal salts and remaining monomers can be easily removed. In the present invention, its purification method is not particularly restricted, and a polyether ketone of high purity can be obtained easily by, for example, purification treatments using pure water, hydrochloric acid water, alcohol or acetone.

The content of impurities (typically, alkali metal components) in the polyether ketone obtained in the present invention is preferably 20 ppm or less, more preferably 10 ppm or less. When the amount of the alkali metal contained is smaller, metal components contained are not eluted even under environments in use, the breakdown voltage does not lower, and the mechanical strength does not decrease, desirably.

With the polyether ketone of the present invention, the amount of an out gas generated in keeping at 240° C. for 30 minutes is preferably 100 ppm or less, more preferably 70 ppm or less, in terms of toluene. When the amount of an out gas generated is smaller, decrease in the degree of vacuum with the lapse of time does not occur for example in use for coating and seal of a vacuum vapor-deposition apparatus, and problems such as pollution of a deposited substance with the generate gas, do not occur, desirably.

The polyether ketone obtained by the present invention has its degree of polymerization of preferably from 0.5 to 2.0 dl/g, more preferably from 0.7 to 1.5 dl/g, in terms of reduction viscosity ($\eta$ inh) in the case of dissolution of 0.5 g of the polyether ketone in 100 ml of a mixed solvent of 90 wt. % p-chlorophenol/10 wt. % phenol, and measurement by a Ubbellohde viscometer at 35° C. Regarding the polymerization degree of the polyether ketone, the number-average molecular weight (Mn) is preferably from 30,000 to 80,000, more preferably from 30,000 to 50,000, and the weight-average molecular weight (Mw) is preferably from 150,000 to 350,000, in terms of molecular weight reduced by polystyrene in GPC (gel permeation chromatography) measurement. When the degree of polymerization is higher, mechanical strength sufficient as a coat or molded article is obtained, preferably.

The polyether ketone obtained by the present invention can be used in the same manner as for conventional polyether ketones in uses to which conventional polyether ketones are subjected. Furthermore, the polyether ketone obtained by the present invention is, due to small particle size and small content of impurities, suitable as a coating material, and can give an excellent coat. In coating, the polyether ketone can be subjected to, for example, powder painting, electrostatic painting, slurry painting dispersed in a solvent, because of small particle size. Among them, it is suitable as a coating material for piping, washing bath and vapor-deposition apparatus in the process of producing electric and electronic components and semiconductors.

The polyether ketone obtained by the present invention is, due to extremely small amount of alkali metal components and volatile impurities contained, suitable as a material for electric and electronic components and semiconductors, and apparatuses and jigs in producing them, to which conventional polyether ketones cannot be applied. Specifically, it is suitable for films, belts, IC trays, IC sockets, wafer carriers, display base plate carriers, connectors, sockets, bobbins, hard disk carriers, crystal oscillator producing trays, plasma rings, seal rings and piping flanges.

The present invention will be illustrated further specifically by the following examples, but the scope of the invention is not limited to these examples.

Measurement methods for evaluations in examples are shown below.

Reduced viscosity ($\eta$ inh): 0.5 g of a polyether ketone was dissolved in 100 ml of a mixed solvent of 90 wt. % p-chlorophenol/10 wt. % phenol, and the reduced viscosity thereof was measured by a Ubbellohde viscometer at 35° C.

Molecular weight (number-average molecular weight Mn, weight-average molecular weight Mw): 0.5 g of a polyether ketone was dissolved in 100 ml of a mixed solvent of p-chlorophenol/odichlorobenzene, and the molecular weight reduced by polystyrene was measured using as an eluent a p-chlorophenol/odichlorobenzene mixed solvent at 40° C. by GPC.

Primary particle size: The presence or absence of primary particles was confirmed by an image observed at a magnification of 20 using a laser microscope, and the diameter of the primary particle was measured.

Average particle size: The particle size distribution of particles dispersed in water was measured providing the refractive index of the particle is 1.65, by a laser diffraction scattering method, then, the particle size at a cumulative frequency of 50% was used as an average particle size.

Alkali metal component: 2 g of a polyether ketone was collected in a quartz conical beaker, 10 ml of sulfuric acid was added to this and the mixture was over-heated with a heater to decompose organic substances, further nitric acid was gradually added to cause carbonization to obtain a transparent solution of which volume was made constant before measurement by ICP (ion chromato light-emitting method), and the measured value was compared with that of a standard solution of an alkali metal, to determine the content thereof.

Out gas: A polymer was kept at 240° C. for 30 minutes, and the generated gas was cold-trapped at −120° C., then, the gas was heated up to 250° C. at a rate of 10° C. per minute and measured by GC-MS (gas chromatograph mass spectrometer), and the resulted value was quantified as a value reduced by toluene.

EXAMPLE 1

Into a flask equipped with a stirrer, nitrogen introducing tube, condenser and thermometer was charged 43.64 g (0.2 mol) of 4,4'-difluorobenzophenone, 21.80 g (0.198 mol) of hydroquinone, 22.26 g (0.21 mol) of anhydrous sodium carbonate and 660 g of N-methyl-2-pyrrolidone. Thereafter, this solution was stirred, and heated up to 205° C. while passing a nitrogen gas. After initiation of heating, vaporization of water together with a solvent occurred, and a part of this was condensed in the condenser and returned into the reaction system, and a part of this was distilled off out of the system from the upper part of a cooling tube by passing of a nitrogen gas. Then 3 hours after initiation of heating, a polymer deposited in the solution. At this stage, a part of the reaction mass was sampled. Further, the reaction was continued under this condition for 5 hours, then, the reaction vessel was cooled to stop the polymerization. The solid substance recovered by filtration was washed with dilute hydrochloric acid water, methanol and acetone, to remove the polymerization catalyst and inorganic salts. Then, the residue was dried at 200° C. for 2 hours under nitrogen flow, to obtain 56.29 g of a polymer (yield: 98%).

The resulted polymer had an average particle size of 44 μm, a primary particle size of 18 μm, a $\eta$ inh of 0.86 dl/g, a number-average molecular weight Mn of 34,000, a weight-average molecular weight Mw of 208,000, an alkali metal content of 8 ppm, and an out gas amount of 65 ppm. An image of a polymer particle observed by a laser microscope is shown in FIG. 1. The reaction mass sampled in depositing was washed and dried in a like manner to obtain a polymer having a $\eta$ inh of 0.27 dl/g.

EXAMPLE 2

Polymerization was performed in the same manner as in Example 1 except that time from initiation of heating to stopping of polymerization was 9 hours, to obtain a polymer. The resulted polymer had an average particle size of 47 μm, a primary particle size of 20 μm, a $\eta$ inh of 0.95 dl/g, a number-average molecular weight Mn of 36,000, a weight-average molecular weight Mw of 221,000, an alkali metal content of 8 ppm, and an out gas amount of 68 ppm. The reaction mass sampled in depositing was washed and dried in a like manner to obtain a polymer having a $\eta$ inh of 0.28 dl/g.

EXAMPLE 3

Polymerization was performed in the same manner as in Example 2 except that 1,3-dimethylimidazolidinone was used instead of N-methyl-2-pyrrolidone, the reaction temperature was 220° C., and time from initiation of heating to stopping of polymerization was 4 hours, to obtain a polymer. The resulted polymer had an average particle size of 44 μm, a primary particle size of 18 μm, a $\eta$ inh of 0.93 dl/g, a number-average molecular weight Mn of 35,000, a weight-average molecular weight Mw of 181,000, an alkali metal content of 7 ppm, and an out gas amount of 55 ppm. The reaction mass sampled in depositing was washed and dried in a like manner to obtain a polymer having a $\eta$ inh of 0.28 dl/g.

EXAMPLE 4

Polymerization was performed in the same manner as in Example 2 except that 4,4'-dihydroxybenzophenone was used instead of hydroquinone, to obtain a polymer. The resulted polymer had an average particle size of 42 μm, a primary particle size of 18 μm, a $\eta$ inh of 0.90 dl/g, a number-average molecular weight Mn of 32,000, a weight-average molecular weight Mw of 180,000, an alkali metal content of 8 ppm, and an out gas amount of 50 ppm. The reaction mass sampled in depositing was washed and dried in a like manner to obtain a polymer having a $\eta$ inh of 0.28 dl/g.

EXAMPLE 5

Polymerization was performed in the same manner as in Example 2 except that 4,4'-dihydroxybiphenyl was used instead of hydroquinone, to obtain a polymer. The resulted polymer had an average particle size of 44 μm, a primary particle size of 17 μm, a $\eta$ inh of 0.89 dl/g, a number-average molecular weight Mn of 32,000, a weight-average molecular weight Mw of 180,000, an alkali metal content of 8 ppm, and an out gas amount of 53 ppm. The reaction mass sampled in depositing was washed and dried in a like manner to obtain a polymer having a η inh of 0.27 dl/g.

EXAMPLE 6

Into a flask equipped with a stirrer, nitrogen introducing tube, condenser and thermometer was charged 43.64 g (0.2 mol) of 4-hydroxy-4'-fluorobenzophenone, 22.26 g (0.21 mol) of anhydrous sodium carbonate and 405 g of N-methyl-2-pyrrolidone. Thereafter, this solution was stirred, and heated up to 205° C. while passing a nitrogen gas. After initiation of heating, vaporization of water together with a solvent occurred, and a part of this was condensed in the condenser and returned into the reaction system, and a part of this was distilled off out of the system from the upper part of a cooling tube by passing of a nitrogen gas. Then 3 hours after initiation of heating, a polymer deposited in the solution. At this stage, a part of the reaction mass was sampled. Further, the reaction was continued under this condition for 5 hours, then, the reaction vessel was cooled to stop the polymerization. The solid substance recovered by filtration was washed with dilute hydrochloric acid water, methanol and acetone, to remove the polymerization catalyst and inorganic salts. Then, the residue was dried at 200° C. for 2 hours under nitrogen flow, to obtain 34.54 g of a polymer (yield: 98%).

The resulted polymer had an average particle size of 40 μm, a primary particle size of 15 μm, a η inh of 0.87 dl/g, a number-average molecular weight Mn of 32,500, a weight-average molecular weight Mw of 204,000, an alkali metal content of 7 ppm, and an out gas amount of 60 ppm. The reaction mass sampled in depositing was washed and dried in a like manner to obtain a polymer having a η inh of 0.25 dl/g.

EXAMPLE 7

Into a flask equipped with a stirrer, nitrogen introducing tube, condenser and thermometer was charged 43.64 g (0.2 mol) of 4,4'-difluorobenzophenone, 21.80 g (0.198 mol) of hydroquinone, 22.26 g (0.21 mol) of anhydrous sodium carbonate, 660 g of N-methyl-2-pyrrolidone and 3.6 g of water. Thereafter, this solution was stirred, and heated up to 205° C. while passing a nitrogen gas. After initiation of heating, vaporization of water together with a solvent occurred, and a part of this was condensed in the condenser and returned into the reaction system, and a part of this was distilled off out of the system from the upper part of a cooling tube by passing of a nitrogen gas. Then 3 hours after initiation of heating, a polymer deposited in the solution. At this stage, a part of the reaction mass was sampled. Further, the reaction was continued under this condition for 5 hours, then, the reaction vessel was cooled to stop the polymerization. The solid substance recovered by filtration was washed with dilute hydrochloric acid water, methanol and acetone, to remove the polymerization catalyst and inorganic salts. Then, the residue was dried at 200° C. for 2 hours under nitrogen flow, to obtain 56.38 g of a polymer (yield: 98%).

The resulted polymer had an average particle size of 42 μm, a primary particle size of 16 μm, a η inh of 0.88 dl/g, a number-average molecular weight Mn of 34,500, a weight-average molecular weight Mw of 209,000, an alkali metal content of 7 ppm, and an out gas amount of 62 ppm. The reaction mass sampled in depositing was washed and dried in a like manner to obtain a polymer having a η inh of 0.28 dl/g.

EXAMPLE 8

Into a 100 ml flask equipped with a stirrer, nitrogen introducing tube, distilled substance separator, condenser and thermometer was charged 3.277 g (15.02 mmol) of 4,4'-difluorobenzophenone, 1.652 g (15.00 mmol) of hydroquinone, 2.21 g (16 mmol) of anhydrous sodium carbonate, and 50 ml of 1,3-dimethyl-2-imidazolidinone. Thereafter, this solution was stirred, and heated up to 230° C. while passing a nitrogen gas. After initiation of heating, distillation of water and solvent initiated together with increase in temperature, the distilled substance was condensed, then, passed through a molecular sieve to remove water, and the reaction was continued while returning in the reaction system. Then 1 hour after initiation of heating, a polymer deposited in the solution. At this stage, a part of the reaction mass was sampled. Further, the reaction was continued under this condition for 6 hours, then, the reaction vessel was cooled to stop the polymerization. The solid substance recovered by filtration was washed with dilute hydrochloric acid water, methanol and acetone, to remove the polymerization catalyst and inorganic salts. Then, the residue was dried at 200° C. for 2 hours under nitrogen flow, to obtain 4.29 g of a polymer (yield: 99%).

The resulted polymer had an average particle size of 41 μm, a primary particle size of 17 μm, a η inh of 0.91 dl/g, a number-average molecular weight Mn of 32,000, a weight-average molecular weight Mw of 180,000, an alkali metal content of 8 ppm, and an out gas amount of 67 ppm. The reaction mass sampled in depositing was washed and dried in a like manner to obtain a polymer having a η inh of 0.26 dl/g.

EXAMPLE 9

Into a flask equipped with a stirrer, nitrogen introducing tube, condenser and thermometer was charged 10.9100 g (50 mmol) of 4,4'-difluorobenzophenone, 5.5055 (50 mmol) of hydroquinone, 7.2560 g (52.5 mmol) of anhydrous sodium carbonate, and 130 g of 1,3-dimethylimidazolidinone. Thereafter, this solution was stirred, and heated up to 224° C. while passing a nitrogen gas. After initiation of heating, distillation of water together with a solvent occurred, and a part of this was condensed in the condenser and returned into the reaction system, and a part of this was distilled off out of the system from the upper part of a cooling tube by passing of a nitrogen gas. Then 1 hour after initiation of heating, a polymer deposited in the solution. At this stage, a part of the reaction mass was sampled. Further, the reaction was continued under this condition for 1 hour, then, the reaction vessel was cooled to stop the polymerization. The solid substance recovered by filtration was washed with dilute hydrochloric acid water, methanol and acetone, to remove the polymerization catalyst and inorganic salts. Then, the residue was dried at 200° C. for 2 hours under nitrogen flow, to obtain 14.09 g of a polymer (yield: 99%).

The resulted polymer had an average particle size of 40 μm, a primary particle size of 17 μm, a η inh of 0.87 dl/g, a number-average molecular weight Mn of 32,500, a weight-average molecular weight Mw of 204,000, an alkali metal content of 8 ppm, and an out gas amount of 62 ppm. The reaction mass sampled in depositing was washed and dried in a like manner to obtain a polymer having a η inh of 0.26 dl/g.

EXAMPLE 10

Polymerization was performed in the same manner as in Example 9 except that the reaction time was 4 hours. The resulted polymer had an average particle size of 43 μm, a primary particle size of 19 μm, a η inh of 1.32 dl/g, a number-average molecular weight Mn of 49,000, a weight-average molecular weight Mw of 298,000, an alkali metal content of 7 ppm, and an out gas amount of 65 ppm. The reaction mass sampled in depositing was washed and dried in a like manner to obtain a polymer having a η inh of 0.32 dl/g.

EXAMPLE 11

Polymerization was performed in the same manner as in Example 9 except that N-methyl-2-pyrrolidone was used instead of 1,3-dimethylimidazolidinone and the reaction temperature was 204° C., to obtain a polymer. The resulted polymer had an average particle size of 41 μm, a primary particle size of 19 μm, a η inh of 1.05 dl/g, a number-average molecular weight Mn of 40,000, a weight-average molecular weight Mw of 242,000, an alkali metal content of 7 ppm, and an out gas amount of 60 ppm. The reaction mass sampled in depositing was washed and dried in a like manner to obtain a polymer having a η inh of 0.29 dl/g.

EXAMPLE 12

Into a flask equipped with a stirrer, nitrogen introducing tube, condenser, dropping funnel and thermometer was charged 50 ml of nitrobenzene and 10 g of aluminum chloride. Thereafter, a solution prepared by dissolving 4.25 g of diphenyl ether and 5.07 g of isophthalic chloride in 25 ml of nitrobenzene was dropped while stirring. These were reacted for 14 hours while keeping the reaction solution at 65° C., then, this solution was put into 200 ml of methanol. A white solid recovered by filtration was washed with dilute hydrochloric acid water and methanol, then, dried under reduced pressure at 65° C., to obtain 6.9 g of a polymer (yield: 93%).

The resulted polymer had an average particle size of 48 μm, a primary particle size of 19 μm, a η inh of 0.20 dl/g, an alkali metal content of 1 ppm or less, and an out gas amount of 105 ppm.

EXAMPLE 13

Into a tube under a dry atmosphere, 14.15 g of p-phenoxybenzoic acid was charged and cooled down to −80° C., then, to this was added 13.2 g of hydrogen fluoride and 26.6 g of boron fluoride. These were reacted at 20° C. for 2 hours and at 40° C. for 2 hours. The resulted solid was washed with methanol, then, dried under reduced pressure at room temperature to obtain 11.67 g of a polymer (yield: 90%).

The resulted polymer had an average particle size of 43 μm, a primary particle size of 16 μm, a η inh of 0.53 dl/g, an alkali metal content of 1 ppm or less, and an out gas amount of 78 ppm.

COMPARATIVE EXAMPLE

Into a flask equipped with a stirrer, nitrogen introducing tube, distilled substance separator, condenser with trap, and thermometer was charged 10.91 g (50 mmol) of 4,4'-difluorobenzophenone, 5.51 g (50 mmol) of hydroquinone, 7.26 g (52.5 mmol) of anhydrous potassium carbonate and 130 g of diphenylsulfone. This solution was stirred, and heated gradually up to 3200° C. while passing a nitrogen gas, to find completion dissolution of the raw materials. The produced water was removed out of the system by condensing in the condenser with trap. After the reaction for 3 hours, the reaction vessel was cooled to stop the polymerization. The resulted solid was ground, then, washed with water and acetone, to remove the solvent and inorganic salts. Thereafter, the residue was dried at 2000°C. for 2 hours under nitrogen flow, to obtain 13.52 g of a polymer (yield: 94%).

Figure 2:
FIG. 2 is a view of the image of a polymer particle obtained in Comparative Example observed by a laser microscope.

The resulted polymer had an average particle size of 80 μm, and as a result of observation with a microscope, the grain obtained by grinding was sharp and not spherical, and was not in the form of coagulation of spherical particles. An image of a polymer particle observed by a laser microscope is shown in FIG. 2. The resulted polymer had a η inh of 0.90 dl/g, a number-average molecular weight Mn of 39,000, a weight-average molecular weight Mw of 254,000, an alkali metal content of 130 ppm, and an out gas amount of 380 ppm.

As described above, the polyether ketone obtained in this example of the present invention was that having an average particle size of 100 μm or less, a primary particle size of 50 μm or less, an alkali metal content of 20 ppm or less, an out gas amount of 100 ppm or less, a reduced viscosity of 0.5 to 2.0 dl/g, a number-average molecular weight (Mn) of 30,000 to 80,000, a weight-average molecular weight (Mw) of 150,000 to 350,000. These can be suitably subjected to electric and electronic component and semiconductor uses and coating uses to which polyether ether ketone produced in conventional methods cannot be applied.

The invention claimed is:

1. A method of producing a polyether ketone by a desalting polycondensation, which comprises:
    (a) reacting an aromatic diol with a halogenated benzophenone in the presence of an organic solvent and an alkali metal compound as a catalyst at a temperature of 150° to 250° C., wherein the molar ratio of aromatic diol to halogenated benzophenone is in the range of 0.8–1.2:1.2–0.8;
    (b) maintaining the polycondensation in the presence of water, the amount of water being in the range of about 0.01 to 10 moles per mole of aromatic diol; and
    (c) recovering the polyether ketone which deposits from the reaction medium, said polyether ketone having a primary particle size of 50 μm or less, wherein the reduced viscosity (ηinh) is from 0.5 to 2.0 dl/g as measured by a Ubbellohde viscometer at 35°C. in a solution prepared by dissolving 0.5 g of polyether ketone in 100 ml of a mixed solvent of 90 wt.% of p-chlorophenol and 10 wt.% of phenol, and the alkali metal content is 20 ppm or less.

2. A method of producing a polyether ketone by a desalting polycondensation, which comprises:
    (a) reacting an aromatic diol with a halogenated benzophenone in the presence of an organic solvent and an alkali metal compound as a catalyst at a temperature of 150° to 250° C., wherein the molar ratio of aromatic diol to halogenated benzophenone is in the range of 0.8–1.2 :1.2–0.8;
    (b) maintaining the polycondensation in the presence of water, the amount of water being in the range of about 0.01 to 10 moles per mole of aromatic diol; and
    (c) recovering the polyether ketone which deposits from the reaction medium, said polyether ketone having a primary particle size of 50 μm or less, wherein the alkali metal content is 20 ppm or less.

3. A method of producing a polyether ketone by desalting polycondensation comprising:
(a) reacting an aromatic diol with a halogenated benzophenone in the presence of an organic solvent and an alkali metal compound as a catalyst at a temperature of 150° to 250° C., wherein the molar ratio of aromatic diol to halogenated benzophenone is in the range of 0.8–1.2:1.2–0.8;
(b) maintaining polycondensation in the presence of water, the amount of water being in the range of about 0.01 to 10 moles per mole of aromatic diol; and
(c) recovering the polyether ketone which deposits from the reaction medium.

* * * * *